US008334866B2

(12) United States Patent
Tan et al.

(10) Patent No.: US 8,334,866 B2
(45) Date of Patent: Dec. 18, 2012

(54) METHODS, SYSTEMS, DEVICES AND COMPONENTS FOR REDUCING POWER CONSUMPTION IN AN LCD BACKLIT BY LEDS

(75) Inventors: Jit Cheh Tan, Singapore (SG); Tan Boon Keat, Singapore (SG)

(73) Assignee: Intellectual Discovery Co., Ltd., Seoul (KR)

( * ) Notice: Subject to any disclaimer, the term of this patent is extended or adjusted under 35 U.S.C. 154(b) by 651 days.

(21) Appl. No.: 12/561,718

(22) Filed: Sep. 17, 2009

(65) Prior Publication Data

US 2011/0063276 A1 Mar. 17, 2011

(51) Int. Cl.
*G06F 3/038* (2006.01)

(52) U.S. Cl. ........... 345/212; 345/210; 345/102; 345/84

(58) Field of Classification Search .................... 345/89, 345/102, 212, 690, 691, 210, 84; 349/67, 349/69; 340/565; 250/221
See application file for complete search history.

(56) References Cited

U.S. PATENT DOCUMENTS

| | | | | |
|---|---|---|---|---|
| 6,603,485 | B2 | 8/2003 | Forman | |
| 6,801,811 | B2 | 10/2004 | Ranganathan et al. | |
| 7,389,432 | B2 | 6/2008 | Chandley et al. | |
| 2002/0097210 | A1* | 7/2002 | Lonoce et al. | 345/87 |
| 2006/0132474 | A1 | 6/2006 | Lam | |
| 2007/0296684 | A1 | 12/2007 | Thomas et al. | |
| 2008/0158240 | A1* | 7/2008 | Huang et al. | 345/589 |
| 2008/0174429 | A1* | 7/2008 | Jensen et al. | 340/565 |
| 2008/0309254 | A1 | 12/2008 | Berger | |
| 2009/0114800 | A1* | 5/2009 | Jensen et al. | 250/221 |
| 2009/0141212 | A1* | 6/2009 | Harbers et al. | 349/67 |
| 2009/0179843 | A1* | 7/2009 | Ackermann et al. | 345/89 |
| 2009/0273737 | A1* | 11/2009 | Zhao et al. | 349/69 |
| 2010/0295767 | A1* | 11/2010 | Lee et al. | 345/102 |

OTHER PUBLICATIONS

T.-F. Wu et al., "Sequential color LED backlight driving system for LCD panels with area control", IEEE, Feb. 2007, pp. 2947-2952.* http://www.videsignline.com/212002498%3Bjsessionid=2FZGGHOJOWXZ4QSNDLQCKH0CJUNN2JVN?printableArticle=true; "Greener LCD-TVs, more contrast with smarter LED backlights," William Jans, Nov. 14, 2008.

http://www2.electronicproducts.com/Design_considerations_when_backlighting_with_LEDs-article-farc_osram_may2009-html.aspx; "Design Considerations when Backlighting with LEDs," Francis Nguyen, May 2009.

* cited by examiner

*Primary Examiner* — Thuy Pardo
(74) *Attorney, Agent, or Firm* — Fox Rothschild LLP

(57) ABSTRACT

Disclosed are various embodiments of methods, systems, devices and components for reducing power consumption in an LCD display that is backlit by LEDs. The various embodiments typically require the use of an array of backlighting LEDs disposed beneath and configured to emit light in the direction of an overlying LCD or LCD panel. In such an array, some LEDs are operated or driven at a first brightness, while other LEDs are operated or driven at a second brightness that is different from the first brightness, or at no brightness at all (i.e., such LEDs are turned off). LED brightnesses and therefore backlighting brightnesses over different portions of display or screen are varied and determined in accordance with the portion of display or screen that a user or processor has selected for viewing ("the area of interest").

30 Claims, 5 Drawing Sheets

METHODS, SYSTEMS, DEVICES AND COMPONENTS FOR REDUCING POWER CONSUMPTION IN AN LCD BACKLIT BY LEDS

FIELD OF THE INVENTION

Various embodiments of the invention described herein relate to the field of LED-backlit liquid crystal displays ("LCDs"). Embodiments of the invention described are especially amenable for use in battery-operated portable or handheld devices such cell phones, MP3 players, personal computers, game controllers, laptop computers, PDAs and the like.

BACKGROUND

A liquid-crystal display ("LCD") may be considered a variable light filter. Liquid crystals are trapped between two sheets of glass and walled off from one another into image bits called pixels. Such crystals twist and untwist to let polarized light through, and filters placed in front of the pixels are used to create the resulting colors produced by the LCD. Since an LCD modifies light and does not create it, the visual image produced by the LCD typically must be backlit by light generated beneath and the LCD and projected in the direction thereof for the image to be visible or discernable to a user.

A cold-cathode fluorescent lamp (CCFL) is often used for backlighting an LCD. One problem that often occurs with the use of a CCFL is that a CCFL only produces an approximation of white light, not true white light. Since an LCD can only present to a user colors that lie within the spectrum of light received by the LCD, a CCFL-based LCD has a color gamut (the extent of the mix of color a display is capable of producing) that relatively small and produces only about 80% of the color gamut recommended by NTSC (National Television Standards Committee) specifications.

An LED (Light Emitting Diode) array may also be used for backlighting an LCD. One advantage of using an LED array for backlighting an LCD is that an LED array can be configured to generate a wider and more accurately tuned spectrum of light than a CCFL. For example, by mixing an appropriate amount of light from red, green, and blue LEDs white light can be generated by an LED array. In addition, since the white balance of an LED array can be adjusted by varying the relative intensity of the red, green, and blue LEDs, the color balance of an LCD may be maintained reasonably accurately over the operating life of the LCD.

Another advantage of using an LED array for backlighting an LCD is that an LED array may provide improved color saturation in the LCD. LEDs are also not as fragile as CCFLs and as a result are more durable. Maintaining the uniformity of light emitted by an LED array becomes progressively more difficult to achieve as the LEDs in an array age, especially since different LEDs in the array may change light emission characteristics at different rates. Also, the use of three separate light sources for red, green, and blue colors of light may cause a point of light appearing on the display to move as the light emission characteristics of the various individual LEDs in the array change at different rates.

LEDs used for backlighting an LCD are typically driven by a driving circuit comprising a current source with Pulse Width Modulation ("PWM"). Such an approach is acceptable for many applications. Other power modulation methods may be used, however.

PWM has several advantages. For example, an LED backlight on an LCD using a fixed DC voltage method may require a driving current of 120 ma to produce a typical brightness of 50 NIT (a unit of measurement of the intensity of visible light, where 1 NIT is equal to one candela per square meter). If instead of using a fixed DC voltage method PWM is used in conjunction with five times the current (600 ma) for ⅕ of the time, the average current remains the same (120 ma), while perceived brightness increases. The human eye has a certain amount of persistence. When exposed to bright light the eye "remembers" the light for a short period of time. This phenomenon results in a motion picture or TV screen being perceived as a steady image when in fact it is, by way of example, flickering at 24 to 50 times per second. When an LED is flashed on at a high level of brightness for a short period of time and then turned off, the eye "remembers" the light at the high brightness level. The result is that the perceived brightness of the backlight is closer to the higher pulsed PWM brightness than it is to a lower average DC brightness.

PWM may also be used to give a "normal" looking brightness level to the LCD by using lower average current to save power. For example, average power may be cut by about 30% while generating a perceived "normal" perceived brightness level. Another use of PWM is to facilitate brightness control for LED backlighting without causing backlighting to appear uneven. By varying the duty cycle of the controlling PWM waveform, a wide range of brightnesses can be achieved while maintaining substantially even appearing backlighting.

Reducing power consumption is an especially important concern in battery-powered portable electronic devices such as laptop computers, PDAs, mobile telephones and the like. As a result, a strong motivation exists to find ways to reduce power consumption in battery-powered portable electronic devices while maintaining device performance.

In battery-operated handheld or portable electronic devices such as smart phones, ultra-mobile personal computers) "UMPCs"), laptop computers, tablet PCs, and e-books, the amount of power required to drive displays in such devices typically consumes between about 25 and 40 percent of the overall power required to operate such devices. Moreover, in backlit LCD displays, LEDs or CCFLs consume the lion's share of the power required to power a backlit LCD. In some cases the relative proportions of power consumed by backlighting LEDs or CCFLs on the one hand, and LCDs on the other hand, are roughly 80 percent and 20 percent, respectively.

Accordingly, LEDs or CCFLs provided to backlight LCD displays consume a disproportionately large amount of the total amount of power required to operate a batter-operated portable electronic device. Ways to reduce power consumption in backlit LCDs in battery-operated handheld or portable electronic devices without sacrificing display performance are therefore desirable.

SUMMARY

In one embodiment, there is provided a method of minimizing power consumption in a display comprising a liquid crystal display ("LCD") and a plurality of LEDs disposed beneath the LCD and configured to provide backlighting thereto comprising selecting or determining an area of interest on the display, modulating power delivered to a first group of LEDs located within or overlapping the area of interest such that light emitted by the first group of LEDs has a first brightness associated therewith, and modulating power delivered to a second group of LEDs located outside or substantially not overlapping the area of interest such that light emitted by the second group of LEDs has a second brightness associated therewith, the first brightness being greater than the second brightness.

In another embodiment, there is provided a system for minimizing power consumption in an electronic device comprising a liquid crystal display ("LCD") operably connected to an LCD driver circuit, a plurality of light emitting diodes ("LEDs") operably connected to an LED driver circuit, the LEDs being disposed beneath the LCD and configured to provide backlighting thereto, a display controller operably connected to the LCD driver circuit and the LED driver circuit, and a power saving circuit operably connected to the display controller, a main processor, and a user input device, wherein at least one of the user input device, the main processor, and the power saving circuit is configured to select or determine an area of interest on the display, the display controller and the LED driver circuit are configured to modulate power delivered to a first group of LEDs located within or overlapping the area of interest such that light emitted by the first group of LEDs has a first brightness associated therewith, and the display controller and the LED driver circuit are further configured to modulate power delivered to a second group of LEDs located outside or substantially not overlapping the area of interest such that light emitted by the second group of LEDs has a second brightness associated therewith, the first brightness being greater than the second brightness.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTIONS OF SOME PREFERRED EMBODIMENTS

Figure 1:
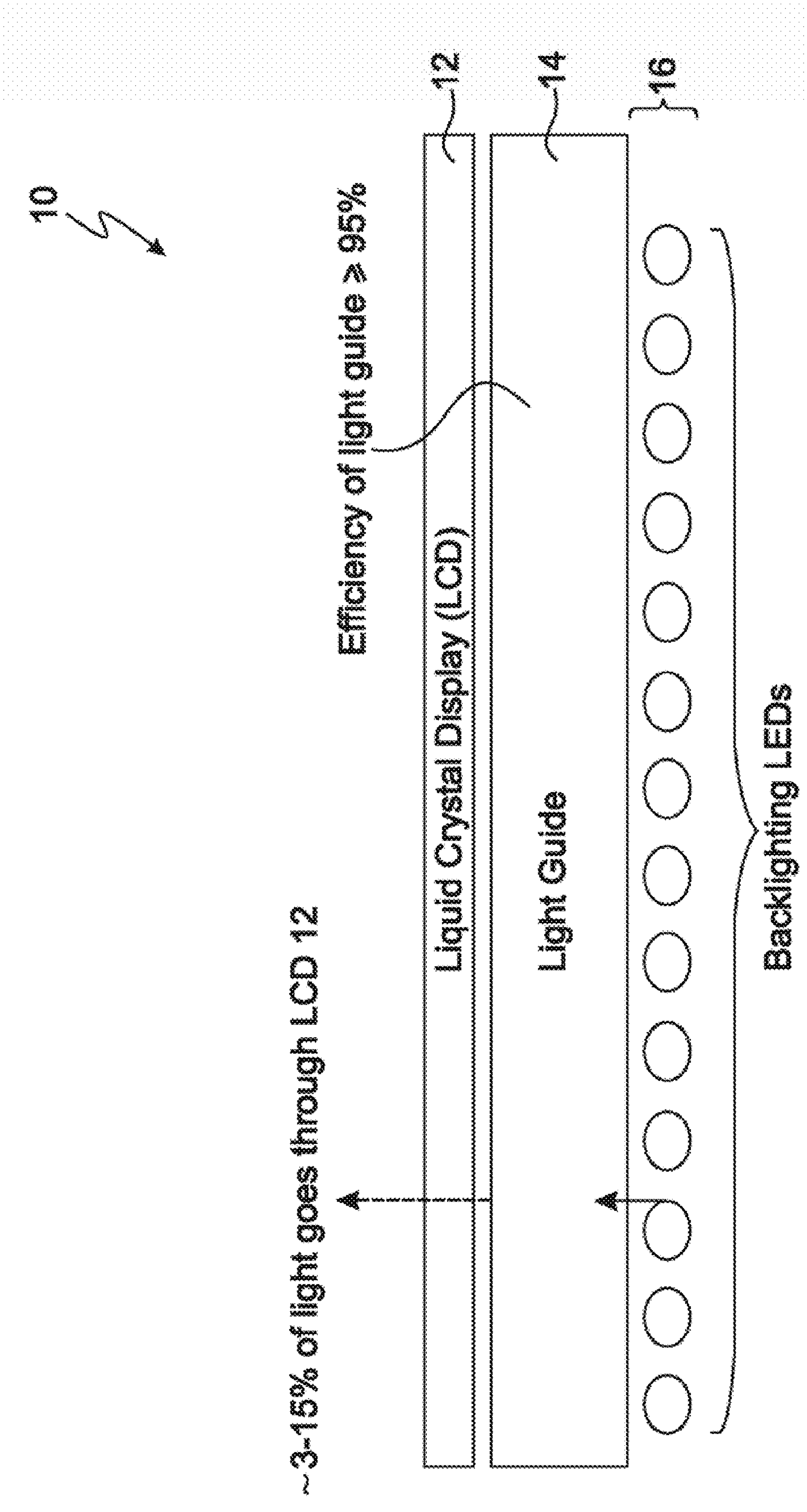
FIG. 1 shows a cross-sectional view of one embodiment of an LED-backlit LCD.
Figure 3:
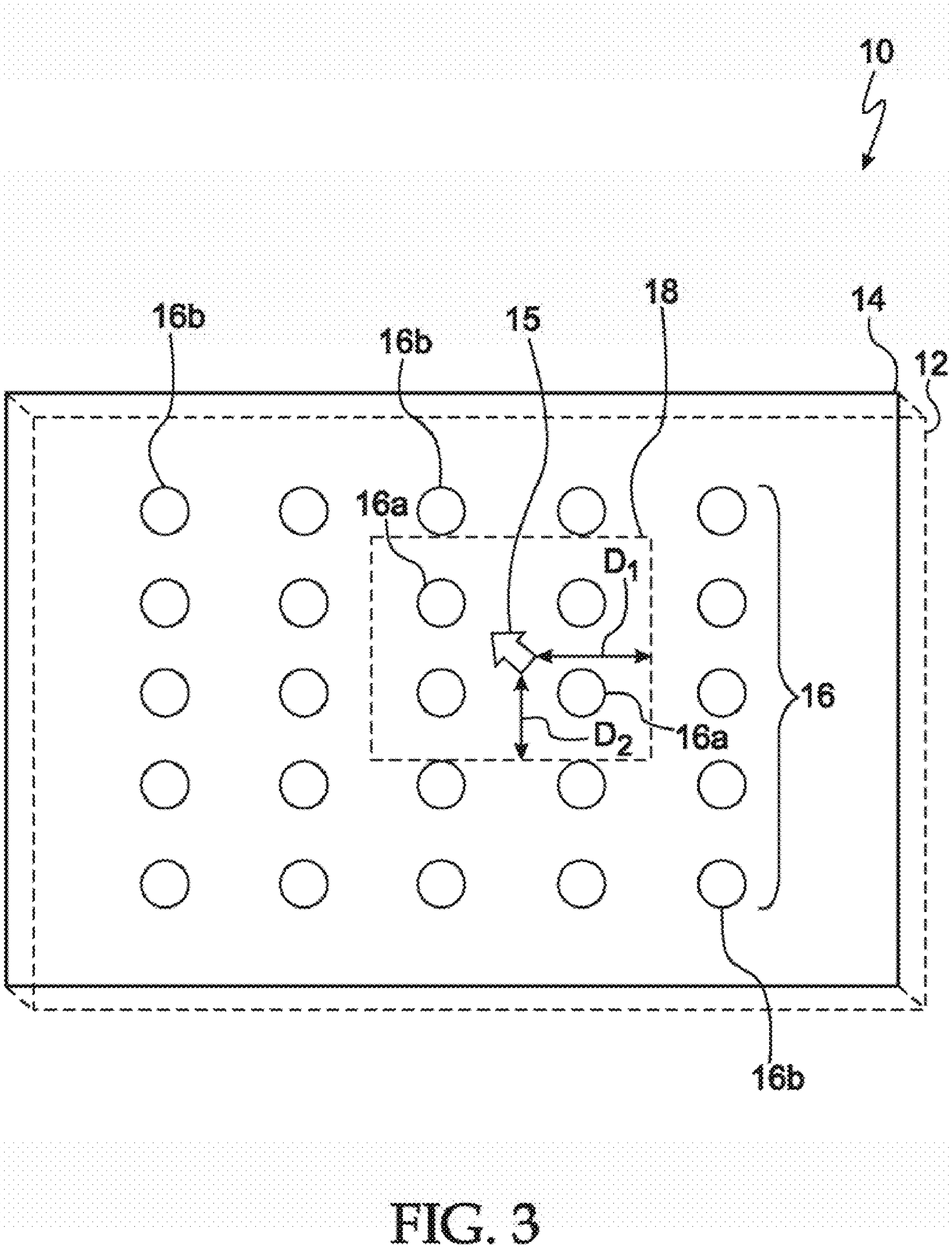
FIG. 3 shows a top perspective view of one embodiment of a display or screen 10 having LCD 12 disposed over light guide 14 and an array of backlighting LEDs 16*a* and 16*b;*

Referring first to FIGS. 1 and 3, the main function of backlighting in an LCD of a display or screen 10 is to illuminate display or screen 10 so that a user can comfortably read the content shown thereon. In some cases, a user may require or only be interested in viewing certain portions of display or screen 10 instead of the entire display or screen. Under such conditions, it is not necessary to provide maximum brightness to backlighting LEDs 16 over the entire display or screen 10. Instead, in one embodiment LEDs 16*a* and 16*b* disposed beneath different portions, regions or areas of display or screen 10 are controlled in such a manner that the light emitted by LEDs 16*a* and 16*b* have different brightnesses associated therewith, where the greatest, highest or maximum brightness is provided to LEDs 16*a* disposed beneath a viewing area or area of interest 18 that has been selected or determined by a user or processor, and the lowest, least or no brightness is provided to LEDs 16*b* that are not disposed beneath such area of interest 18. As a result, battery life for such devices can be extended. When appropriate, the viewing area or area of interest 18 can also be dimmed automatically and dynamically to a predetermined level of decreased brightness. Accordingly, the challenge is to identify area of interest 18 accurately on an on-going and continuous basis as the user or processor selects or determines which portions of display or screen 10 are to be viewed while not causing any inconvenience or disruption to the user.

The various embodiments typically require the use of an array of backlighting LEDs 16 disposed beneath and configured to emit light in the direction of an overlying LCD or LCD panel 12. In such an array, some LEDs 16*a* are operated or driven at a first brightness, while other LEDs 16*b* are operated or driven at a second brightness that is different from the first brightness, or at no brightness at all (i.e., such LEDs are turned off). LED brightnesses and therefore backlighting brightnesses over different portions of display or screen 10 are varied and determined in accordance with the portion of display or screen 10 that a user or processor has selected for viewing. Any number of different predetermined criteria may be employed to determine or select the portion of display or screen 10 that is to be presented at an increased brightness to the user for viewing. Note that according to one embodiment some of the same functionality may be generated using a uni-dimensional LED array configured in a side view LED architecture.

FIG. 1 shows a cross-sectional diagrammatic view of one embodiment of an LED-backlit LCD 10 comprising underlying LEDs 16, light guide 14 and overlying LCD 12. Light guide 14 possesses high efficiency and typically permits 95 percent or more of the light emitted by LEDs 16 to pass therethrough for transmission into LCD 12, which as described above contains liquid crystals disposed between two sheets of optically transmissive material that are walled off from one another into individual pixels. In one embodiment, a small fraction of the light emitted by LEDs 16 (e.g., 3 to 15 percent) that is incident on LCD 12 is transmitted therethrough (assuming the LCD is turned on), the majority of such light being employed to illuminate and brighten the individual pixels in the LCD.

Note that in various embodiments LCD 12 may be a transflective LCD, a transmissive LCD, an active LCD, a negative LCD, a positive LCD or a negative LCD. In some embodiments, colored pixels contained within LCD 12 may comprise subpixels that are associated with each LCD pixel, and that have red, green, and blue color filters associated therewith thereby to create individual color pixels.

Figure 2:
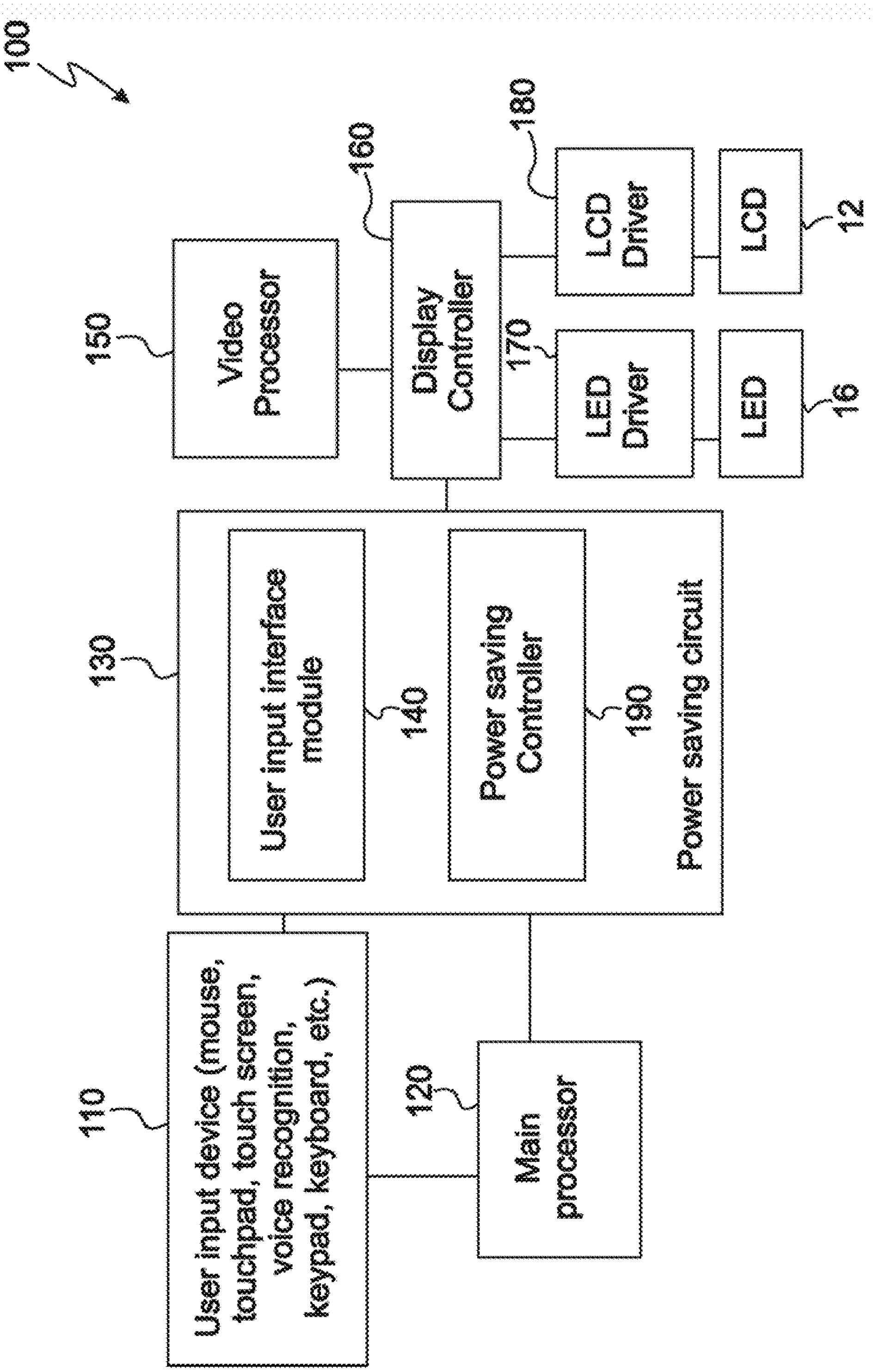
FIG. 2 shows one embodiment of a schematic block diagram of a system configured to differentially modulate the amount of current or power provided to an array of backlighting LEDs disposed beneath an LCD.

Referring now to FIGS. 2 and 3, there is shown one embodiment of system 100 configured to provide selective or differential LED backlighting to LCD 12, where regions of different backlighting brightness are provided in display or screen 10. Area of interest or brightened area 18 is operated at a higher LED backlighting brightness than are those portions which surround area of interest 18 on display or screen 10, where a lower LED backlighting brightness is employed. System 100 shown in FIG. 2 is configured to minimize power consumption in an electronic device within which system 100 is disposed or has been incorporated. As will become apparent upon having read and understood the specification and drawings hereof, the various embodiments of the LED backlighting brightness control systems, devices and components disclosed herein can be used to achieve substantial power savings, and may be applied with particular efficacy to battery-operated portable electronic device.

Continuing to refer to FIGS. 2 and 3, according to one embodiment system 100 comprises LCD 12 operably connected to LCD driver circuit 180, a plurality of light emitting diodes ("LEDs") 16 operably connected to LED driver circuit 170, where the LEDs are disposed beneath LCD panel 12 and are configured to provide backlighting thereto, display controller 160 operably connected to LCD driver circuit 180 and LED driver circuit 170, and a power saving circuit 130 operably connected to display controller 160, main processor 120, and user input device 110. Note that most of the single lines shown between system components in FIG. 2 are intended to denote busses or single-wire connections, as the case may be. Other peripherals may be added or operably connected to these busses, such as memory, memory controllers, and so on.

Continuing to refer to FIGS. 2 and 3, according to one embodiment at least one of user input device 110, main processor 120, and power saving circuit 130 is configured to select or determine an area of interest 18 on display or screen 10 comprising overlying LCD panel 12 and underlying array or matrix of backlighting LEDs 16 (FIG. 3). In one embodiment, display controller 160 and LED driver circuit 170 are configured to modulate power or current delivered to first group of LEDs 16*a* located within or overlapping area of interest 18 such that light emitted by first group of LEDs 16*a* has a first brightness associated therewith. Display controller 160 and LED driver circuit 170 are then further configured to modulate power or current delivered to second group of LEDs 16*b* located outside or substantially not overlapping area of interest 18 such that light emitted by second group of LEDs 16*b* has a second brightness associated therewith, where the first brightness is greater than the second brightness.

As further shown in FIGS. 2 and 3, in one embodiment power saving circuit 130 of system 100 further comprises user input interface module 140 operably connected to user input device 110, as well as power saving controller 190. User input interface module 140 may be configured to permit a user or a processor to select, define or determine the parameters according to which LEDs 16 turned on, turned off, dimmed and/or brightened. Optionally, video processor 150 also may be operably connected to display controller 160. As shown in FIG. 2, user input device 110 may be any one or more of a mouse, a touch pad or touch screen, a keypad, a keyboard, or any other suitable means of providing user input to system 100. Area of interest 18 in display or screen 10 may be selected, determined or defined by a user, or alternatively may be selected, determined or defined by main processor 120, display controller 160 or any other suitable processing or computing device disposed in system 100 or in the electronic device within which system 100 is contained or has been incorporated that has been appropriately programmed and configured to carry out such area of interest selection, determination or definition.

By way of example, area of interest 18 on display or screen 10 may be identified by or be centered within any one or more of a window or a position of a cursor 15 controlled by a mouse or other user input device, or in the alternative may be controlled by auto scrolling. Note that user input device 110, power saving circuit 130 and main processor 120 may further be configured to permit a user to select which particular parameters are employed to identify, delineate, select, define or determine area of interest 18. In one particularly efficacious embodiment, user input device 110, power saving circuit 130 and/or main processor 120 are together configured to permit the user to select or determine area of interest 18 by controlling a position of cursor or pointer 15 on display or screen 10 using a mouse or other suitable input device 110, where the user selects the position of cursor 15 on display or screen 10, which position is in turn employed to determine area of interest 18.

Note further that the term "cursor" as it is employed in the specification and claims hereof means any one or more of an arrow, flashing marker, image, symbol, cross-hairs, icon, vertical line, horizontal line, blinking or changing symbol, block, flashing block or any other indicator employed to show a user where he is pointing on a screen using the user input device, which includes, but is not limited to, a mouse, a touchpad, a touchscreen, voice recognition, a keypad, a keyboard, arrow keys, and other suitable input devices.

According to one embodiment such as that illustrated in FIG. 3, and using the position of cursor 15 on display or screen 10 as a starting point, area of interest 18 is further computed, defined or determined by first predetermined distance $D_1$ from the position of cursor 15, and may further be defined by second predetermined distance $D_2$ from the position of cursor 15. In one embodiment, first predetermined distance $D_1$ is measured in a first direction which is horizontal and second predetermined distance $D_2$ is measured in a second direction different from the first direction and which is vertical. Area of interest 18 may be defined by a square, a rectangle, an oval, a circle or any other suitable shape capable of being generated by the overlying pixels in LCD 12 and the underlying matrix of backlighting LEDs 16 operating at the first and second brightnesses. Thus, for example, a rectangle can define area of interest 18 where the half the width of the rectangle corresponds to first predetermined distance $D_1$ and half the height of the rectangle defines second predetermined distance $D_2$ (see, for example, FIG. 3). Alternatively, the radius of a circle defining area of interest 18 can correspond to first predetermined distance $D_1$. According to one embodiment, a user can select, define or determine a size or dimensions of area of interest 18. In another embodiment, a processor is employed to select, define or determine the size or dimensions of area of interest 18.

The sharpness or resolution with which the boundary between area of interest 18 illuminated by backlighting with a higher first brightness and the surrounding area illuminated by backlighting with a lower second brightness presents itself to a viewer depends, among other factors, on the brightness of backlighting LEDs 16 contained in the LED matrix or array which underlies light guide 14 and LCD 12. The brighter the LEDs 16 contained in such array or matrix, the sharper and more clearly defined is area of interest 18 as it is presented to the viewer. The converse is also true, namely that the lower the brightness of LEDs 16 contained in such array or matrix, the fuzzier or less well defined is the area of interest presented to the viewer.

Note further that in one embodiment some LEDs 16 that fall beneath or near the boundary located between the areas backlit at the first and second brightnesses, respectively, may be backlit or illuminated with a third brightness that lies between the higher first brightness and the lower second brightness. Thus, the boundary region lying between the regions of display or screen 10 that are backlit at the respective first and second brightnesses may be illuminated at a third intermediate intensity or level, which causes the area of interest to blend into the darker background area more evenly than if only two brightnesses are employed to backlight display or screen 10. Note, however, that depending on how regions corresponding to the first, second and third brightnesses are configured or determined, use of third or greater brightness regions may increase power consumption with respect to an embodiment where only first and second brightnesses are employed. By way of example, the area of first brightness (i.e., the area of interest) may be operated at 100% brightness, the area of second brightness (i.e., outside the area of interest) may be operated at 10% brightness, and the area of third brightness (i.e., the area between the area of interest and the area outside the area of interest) may be operated at 70% brightness.

Note that the number of backlighting LEDs 16 and the 5×5 array or matrix in which such LEDs 16 are arranged shown in FIG. 3 is merely illustrative, and that any suitable number or array of n×m or m×m backlighting LEDs 16 may be employed. More or fewer, and denser or sparser arrays of, LEDs 16 may be provided than the configuration shown in FIG. 3. By way of example only, the matrix or array of LEDs 16 disposed beneath light guide 14 and LCD 12 may be configured in 4×4, 3×5, 4×5, 5×5, 4×6, 5×6, 6×6, 4×7, 5×7, 6×7, 7×7, 5×8, 6×8, 7×8, 8×8 arrays or matrices, or any indeed any other suitable n×m or m×m array or matrix.

Continuing to refer to FIG. 3, first group of LEDs 16*a* may be configured to contain fewer LEDs than second group of LEDs 16*b*, or may be configured to contain a predetermined number of LEDs. The number of LEDs to include in first group of LEDs 16*a* may be determined, defined, or selected by one or more of main processor 120, power saving circuit 130, and display controller 160. Second group of LEDs 16*b* may be configured to contain more LEDs than first group of LEDs 16*a*, or may be configured to contain a predetermined number of LEDs. The number of LEDs to include in second group of LEDs 16*b* may be determined, defined, or selected by one or more of main processor 120, power saving circuit 130, and display controller 160.

Continuing to refer to FIGS. 2 and 3, in one embodiment display controller 160 is configured to pulse width modulate the power or current delivered to first group of LEDs 16*a* as well as to second group of LEDs 16*b*. In another embodiment, and to further minimize power consumption, no backlighting is provided by second group of LEDs 16*b* falling outside area of interest 18, and backlighting is provided by second group of LEDs 16*a* falling inside area of interest 18.

In still further embodiments, system 100 may be configured to provide selective or differential LED backlighting to LCD 12 in accordance with the foregoing teachings but on a selective, occasional, intermittent or non-continuous basis. For example, the selective or differential LED backlighting methods, systems, devices and components described above may be actuated automatically when the state of charge in the batteries of a portable electronic device fall below a predetermined threshold. Alternatively, a battery-operated portable electronic device and/or system 100 may be configured to alert a user to a low state of charge in the batteries powering the portable electronic device, as well as to provide an option for the user to switch to a reduced power consumption mode where the display or screen 10 of the device is permitted to enter the energy-saving selective or differential LED backlighting modes described above.

Those skilled in the art will now understand that the various embodiments disclosed herein permit that portion of power consumed by display or screen 10 in a battery-operated portable electronic device to be reduced substantially in respect of conventionally-backlit displays or screens of the prior art. As shown and described, such power consumption reduction is effected through a reduced number of backlighting LEDs 16 being operated at a high brightness beneath area of interest 18 in display or screen 10. Notably, the various embodiments disclosed herein require no complicated expensive and power-consuming image processing to effect power consumption reductions. Instead, in one embodiment a position of cursor 15 or other pointer on display or screen 10 is employed to determine which backlighting LEDs 16 of display or screen 10 are to be driven at a high brightness and which backlighting LEDs 16 of display or screen 10 are to be driven at low or no brightness.

Figure 4:
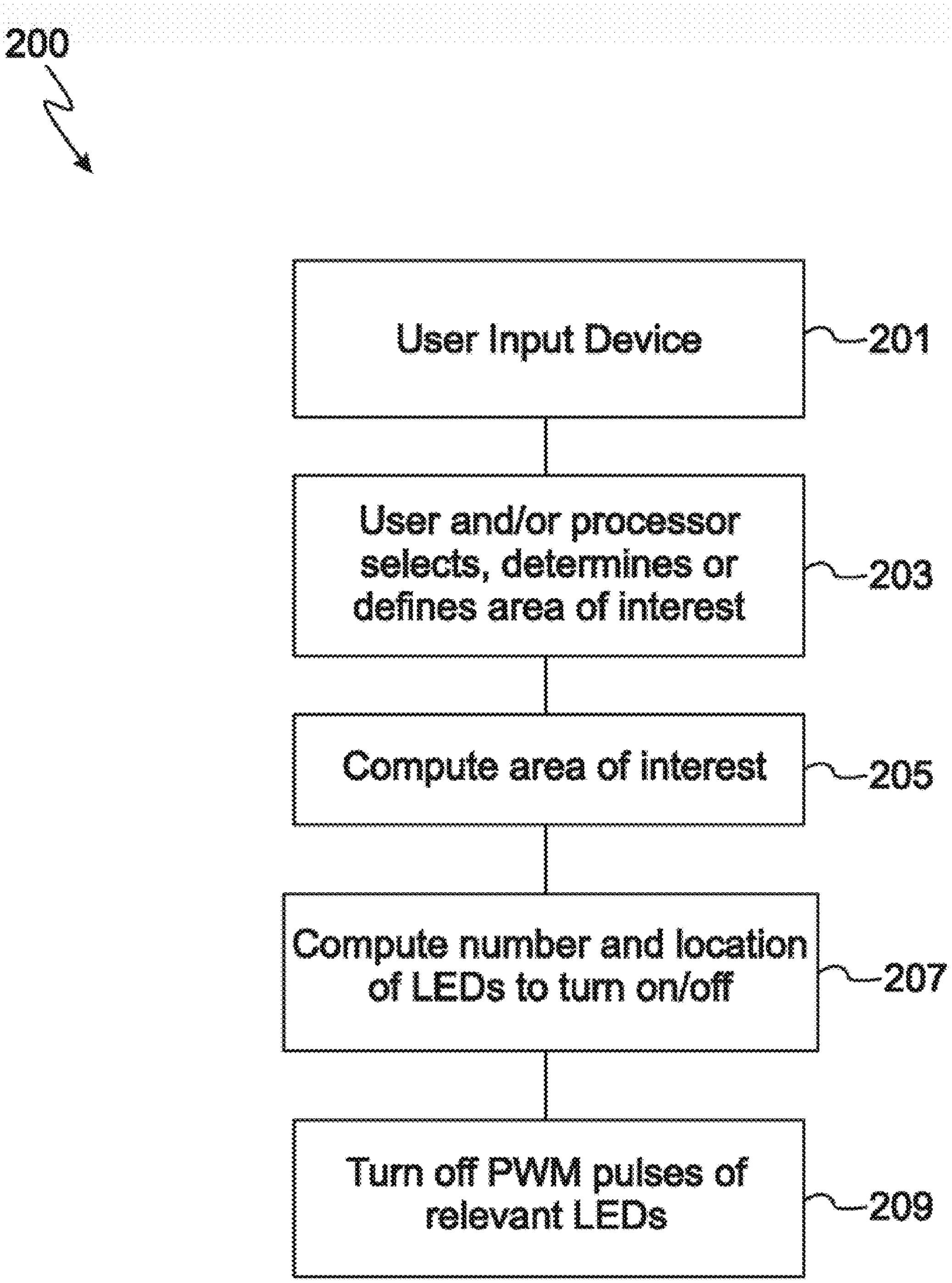
FIG. 4 shows one embodiment of a method of differentially modulating the amount of current or power provided to an array of backlighting LEDs disposed beneath an LCD.

Turning now to FIG. 4, there is shown one embodiment of method 200 for minimizing power consumption in display or screen 10 comprising LCD 12 and a plurality of LEDs 16 disposed beneath LCD 12 and configured to provide backlighting thereto. As shown in FIG. 4, method 200 comprises step 201 where user input device 110 is employed to provide user input to system 100. Next, at step 203 the user and/or a processor selects, determines or defines area of interest 18 on screen or screen 10. At step 205 area of interest 18 is computed by a processor disposed in system 100, or alternatively disposed within the device within which display or screen 10 has been incorporated. Next, at step 207 the number and location of LEDs 16 that are to be turned on or off, or in the alternative that are to be operated at first and second brightnesses, but in either event according to the position of area of interest 18 on display or screen 10, is computed. Finally, at step 209 those LEDs that have been determined or computed to fall outside area of interest 18 are turned off or operated at the second lower brightness. In one embodiment of method 200, the power or current delivered to first group of LEDs 16*a* located within or overlapping area of interest 18 is modulated such that light emitted by first group of LEDs 16*a* has a first brightness associated therewith, and light emitted by second group of LEDs 16*b* has a second brightness associated therewith, where the first brightness is greater than the second brightness.

Figure 5:
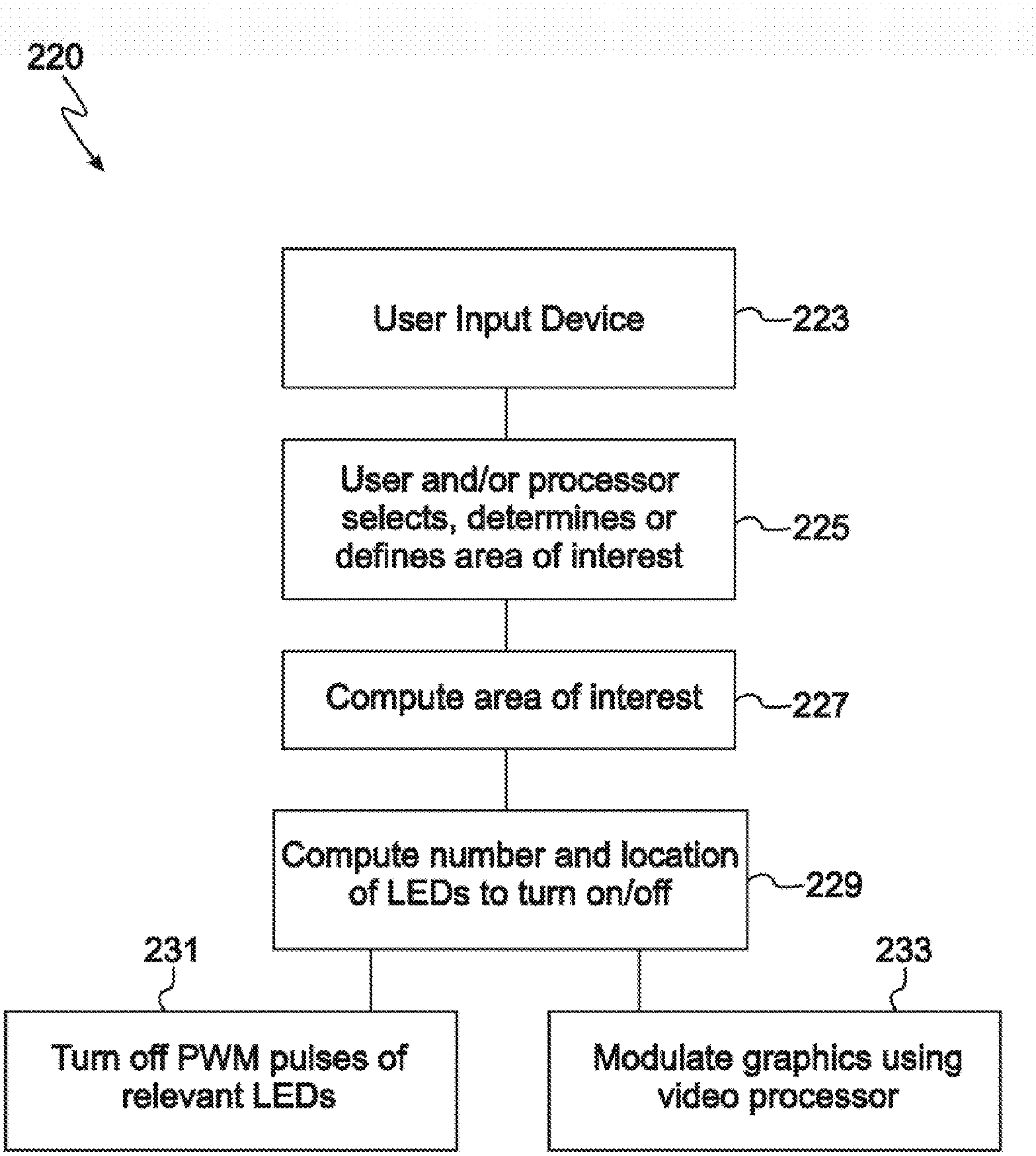
FIG. 5 shows another embodiment of a method of differentially modulating the amount of current or power provided to an array of backlighting LEDs disposed beneath an LCD.

FIG. 5 shows another embodiment of method 220 for minimizing power consumption in display or screen 10 comprising LCD 12 and a plurality of LEDs 16 disposed beneath LCD 12 and configured to provide backlighting thereto. As shown in FIG. 5, method 220 comprises step 223 where user input device 110 is employed to provide user input to system 100. Next, at step 225 the user and/or a processor selects, determines or defines area of interest 18 on display or screen 10. At step 227 area of interest 18 is computed by a processor disposed in system 100, or alternatively disposed within the device within which display or screen 10 has been incorporated. Next, at step 229 the number and location of LEDs 16 that are to be turned on or off, or in the alternative that are to be operated at first and second brightnesses, but in either event according to the position of area of interest 18 on display or screen 10, is computed. At step 231 those LEDs that have been determined or computed to fall outside area of interest 18 are turned off or operated at the second lower brightness. At step 233, graphics shown on display or screen 10 are modulated using video processor 150, where video signals provided to LCD 12 of display or screen 10 are modulated to accommodate the switching on or off, or dimming or brightening of, LEDs 16. Additional step 233 may be employed to compute appropriate brightness compensation factors, scaling and modulation for updated video signals provided to LCD 12 that are the consequence of differential modulation of backlighting LEDs 16. Computed video data may also be employed to more accurately brighten and dim selected LEDs 16 in accordance with cursor 15 or the pointer position. Note further that in one embodiment of method 220 shown in FIG. 5, the power or current delivered to first group of LEDs 16*a* located within or overlapping area of interest 18 is modulated such that light emitted by first group of LEDs 16*a* has a first brightness associated therewith, and light emitted by second group of LEDs 16*b* has a second brightness associated therewith, where the first brightness is greater than the second brightness.

Note that many of various embodiments are not suitable for use in conjunction with a CCFL, as a CCFL is a fluorescent tube that is lit across its entire length, and cannot be operated such that the brightness of the light provided thereby can be varied over its length.

While the primary use of system 100 is believed likely to be in the context of relatively small battery-operated portable electronic devices, it may also be of value in the context of larger devices, including, for example, desktop computers or other less portable devices such as industrial control panels, household appliances, and the like. Similarly, while many embodiments of the invention are believed most likely to be configured for manipulation by a user's fingers, some embodiments may also be configured for manipulation by other mechanisms or body parts. For example, the invention might be located on or in the hand rest of a keyboard and engaged by the heel of the user's hand.

Note further that included within the scope of the present invention are methods of making and having made the various components, devices, systems and methods described herein.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

We claim:

1. A method of minimizing power consumption in a display comprising a liquid crystal display ("LCD") and a plurality of LEDs disposed beneath the LCD and configured to provide backlighting thereto, comprising:

(a) selecting or determining an area of interest on the display;

(b) modulating power delivered to a first group of LEDs located within or overlapping the area of interest such that light emitted by the first group of LEDs has a first brightness associated therewith, and (c) modulating power delivered to a second group of LEDs located outside or substantially not overlapping the area of interest such that light emitted by the second group of LEDs has a second brightness associated therewith, the first brightness being greater than the second brightness, wherein a position on the display is selected to determine the area of interest and wherein a boundary of the area of interest is defined at least partially by a first predetermined distance from the position on the display.

2. The method of claim 1, wherein the area of interest is a window.

3. The method of claim 1, wherein the area of interest is changed in accordance with auto scrolling.

4. The method of claim 1, wherein a user selects parameters employed to identify, delineate, select or determine the area of interest.

5. The method of claim 1, wherein a user selects or determines the area of interest.

6. The method of claim 1, wherein the area of interest is determined by a position of a cursor controllable and moveable by a user or a processor.

7. The method of claim 1, wherein the boundary of the area of interest is further defined at least partially by a second predetermined distance from the position on the display.

8. The method of claim 7, wherein the first predetermined distance is measured in a first direction and the second predetermined distance is measured in a second direction different from the first direction.

9. The method of claim 8, wherein the first direction is horizontal and the second direction is vertical with respect to a width and a height of the display, respectively.

10. The method of claim 1, wherein the first group of LEDs contains fewer LEDs than the second group of LEDs.

11. The method of claim 1, further comprising determining a first number of LEDs to include in the first group of LEDs.

12. The method of claim 1, wherein modulating the power delivered to the first group of LEDs is carried out by pulse width modulation ("PWM").

13. The method of claim 1, wherein modulating the power delivered to the second group of LEDs is carried out by pulse width modulation ("PWM").

14. The method of claim 1, wherein the method is initiated in response to a state of charge of a battery-operated device into which the display has been incorporated being detected as having attained a predetermined level.

15. A system for minimizing power consumption in an electronic device, comprising:

(a) a liquid crystal display ("LCD") operably connected to an LCD driver circuit;

(b) a plurality of light emitting diodes ("LEDs") operably connected to an LED driver circuit, the LEDs being disposed beneath the LCD and configured to provide backlighting thereto;

(c) a display controller operably connected to the LCD driver circuit and the LED driver circuit, and (d) a power saving circuit operably connected to the display controller, a main processor, and a user input device;

wherein at least one of the user input device, the main processor, and the power saving circuit is configured to select or determine an area of interest on the display, the display controller and the LED driver circuit are configured to modulate power delivered to a first group of LEDs located within or overlapping the area of interest such that light emitted by the first group of LEDs has a first brightness associated therewith, and the display controller and the LED driver circuit are further configured to modulate power delivered to a second group of LEDs located outside or substantially not overlapping the area of interest such that light emitted by the second group of LEDs has a second brightness associated therewith, the first brightness, being greater than the second brightness, wherein the user input device and the power saving circuit are configured to facilitate a selection of a position on the screen that in turn is used to determine a boundary of the area of interest and wherein the boundary of the area of interest is defined at least partially by a first predetermined distance from the position on the screen.

16. The system of claim 15, wherein the power saving circuit further comprises a user input interface module operably connected to the user input device and a power saving controller.

17. The system of claim 15, further comprising a video processor operably connected to the display controller.

18. The system of claim 15, wherein the area of interest is identified by a window.

19. The system of claim 15, wherein the area of interest is identified by auto scrolling.

20. The system of claim 15, wherein the user input device and the power saving circuit are configured to permit a user to select parameters employed to identify, delineate, select or determine the area of interest.

21. The system of claim 15, wherein the user input device and the power saving circuit are configured to permit a user to select or determine the area of interest.

22. The system of claim 15, wherein the area of interest is determined at least partially by a position of a cursor moveable by a user operating the user input device.

23. The system of claim 15, wherein the boundary of the area of interest is further defined at least partially by a second predetermined distance from the position.

24. The system of claim 23, wherein the first predetermined distance is measured in a first direction and the second predetermined distance is measured in a second direction different from the first direction.

25. The system of claim 24, wherein the first direction is horizontal and the second direction is vertical with respect to a width and a height of the display, respectively.

26. The system of claim 15, wherein the first group of LEDs contains fewer LEDs than the second group of LEDs.

27. The system of claim 15, wherein at least one of the main processor, the power saving circuit, and the display controller is configured to determine a first number of LEDs to include in the first group of LEDs.

28. The system of claim 15, wherein at least one of the main processor, the power saving circuit, and the display controller is configured to determine a second number of LEDs to include in the second group of LEDs.

29. The system of claim 15, wherein the display controller pulse width modulates the power delivered to the first group of LEDs.

30. The system of claim 15, wherein the display controller pulse width modulates power delivered to the second group of LEDs.

* * * * *